US008363669B2

(12) United States Patent
Mejdrich et al.

(10) Patent No.: US 8,363,669 B2
(45) Date of Patent: Jan. 29, 2013

(54) RECOVERING DATA FROM A PLURALITY OF PACKETS

(75) Inventors: Eric O. Mejdrich, Woodinville, WA (US); Paul E. Schardt, Rochester, MN (US); Robert A. Shearer, Rochester, MN (US); Matthew R. Tubbs, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 239 days.

(21) Appl. No.: 12/823,689

(22) Filed: Jun. 25, 2010

(65) Prior Publication Data
US 2011/0317712 A1 Dec. 29, 2011

(51) Int. Cl.
*H04L 12/56* (2006.01)
(52) U.S. Cl. ........................................... 370/412
(58) Field of Classification Search .................. None
See application file for complete search history.

(56) References Cited

U.S. PATENT DOCUMENTS

| 6,252,950 | B1 * | 6/2001 | Duty et al. ................. 379/111 |
| 7,757,361 | B2 * | 7/2010 | Edwards et al. ................. 26/24 |
| 7,916,322 | B2 * | 3/2011 | Pineau ........................ 358/1.15 |
| 2005/0280652 | A1 * | 12/2005 | Hutchins et al. .............. 345/557 |
| 2006/0147109 | A1 * | 7/2006 | Munsil et al. ................ 382/162 |
| 2006/0259818 | A1 * | 11/2006 | Howell et al. .................. 714/21 |
| 2009/0313592 | A1 * | 12/2009 | Murali et al. ..................... 716/6 |
| 2011/0194487 | A1 * | 8/2011 | Namburi et al. .............. 370/328 |

* cited by examiner

*Primary Examiner* — Dang Ton
*Assistant Examiner* — Ronald H Davis
(74) *Attorney, Agent, or Firm* — Toler Law Group

(57) ABSTRACT

A method includes receiving a plurality of packets at an integrated processor block of a network on a chip device. The plurality of packets includes a first packet that includes an indication of a start of data associated with a pixel shader application. The method includes recovering the data from the plurality of packets. The method also includes storing the recovered data in a dedicated packet collection memory within the network on the chip device. The method further includes retaining the data stored in the dedicated packet collection memory during an interruption event. Upon completion of the interruption event, the method includes copying packets stored in the dedicated packet collection memory prior to the interruption event to an inbox of the network on the chip device for processing.

20 Claims, 4 Drawing Sheets

RECOVERING DATA FROM A PLURALITY OF PACKETS

I. FIELD OF THE DISCLOSURE

The present disclosure relates generally to computer processing, and more specifically, to recovering data from a plurality of packets.

II. BACKGROUND

A computer system may have hardware resources that may be used by a user application. For example, the hardware resources may include a high-speed communication mechanism. Allowing unrestricted access to the hardware resources may enable the user application to make excessive use of the hardware resources to the detriment of other applications that use the hardware resources, while restricting access to the hardware resources may result in slower execution of the user application.

III. SUMMARY

In a particular embodiment, a method includes receiving a plurality of packets at an integrated processor block of a network on a chip device. The plurality of packets includes a first packet that includes an indication of a start of data associated with a pixel shader application. The method includes recovering the data from the plurality of packets and storing the recovered data in a dedicated packet collection memory within the network on the chip device. The method further includes retaining the data stored in the dedicated packet collection memory during an interruption event. Upon completion of the interruption event, the method includes copying the data stored in the dedicated packet collection memory prior to the interruption event to an inbox of the network on the chip device for processing.

In another particular embodiment, a computer program product includes a non-transitory computer usable medium having computer usable program code embodied therewith. The computer usable program code is executable by a processor to determine whether data packets have been received at an inbox of an integrated processor block. The computer usable program code is further executable by the processor to retrieve the data packets from the inbox. The computer usable program code is further executable by the processor to store the data packets in a memory. The computer usable program code is further executable by the processor to instruct the integrated processor block to process the stored data packets. When the stored data packets include code, processing the stored data packets causes the integrated processor block to execute the code to perform a user-specified pixel shader function.

In another particular embodiment, a system includes a hypervisor to retrieve data packets received at an inbox associated with an integrated processor block of a network on a chip. The hypervisor is further operable to store the data packets in a memory and instruct the integrated processor block to process the stored data packets. The integrated processor block is operable to perform a pixel shader function and the stored data packets include input data to the pixel shader function.

These and other advantages and features that characterize embodiments of the disclosure are set forth in the claims annexed hereto and forming a further part hereof. However, for a better understanding of the disclosure, and of the advantages and objectives attained through its use, reference should be made to the drawings and to the accompanying descriptive matter in which there are described exemplary embodiments of the disclosure.

IV. BRIEF DESCRIPTION OF THE DRAWINGS

V. DETAILED DESCRIPTION

Figure 1:
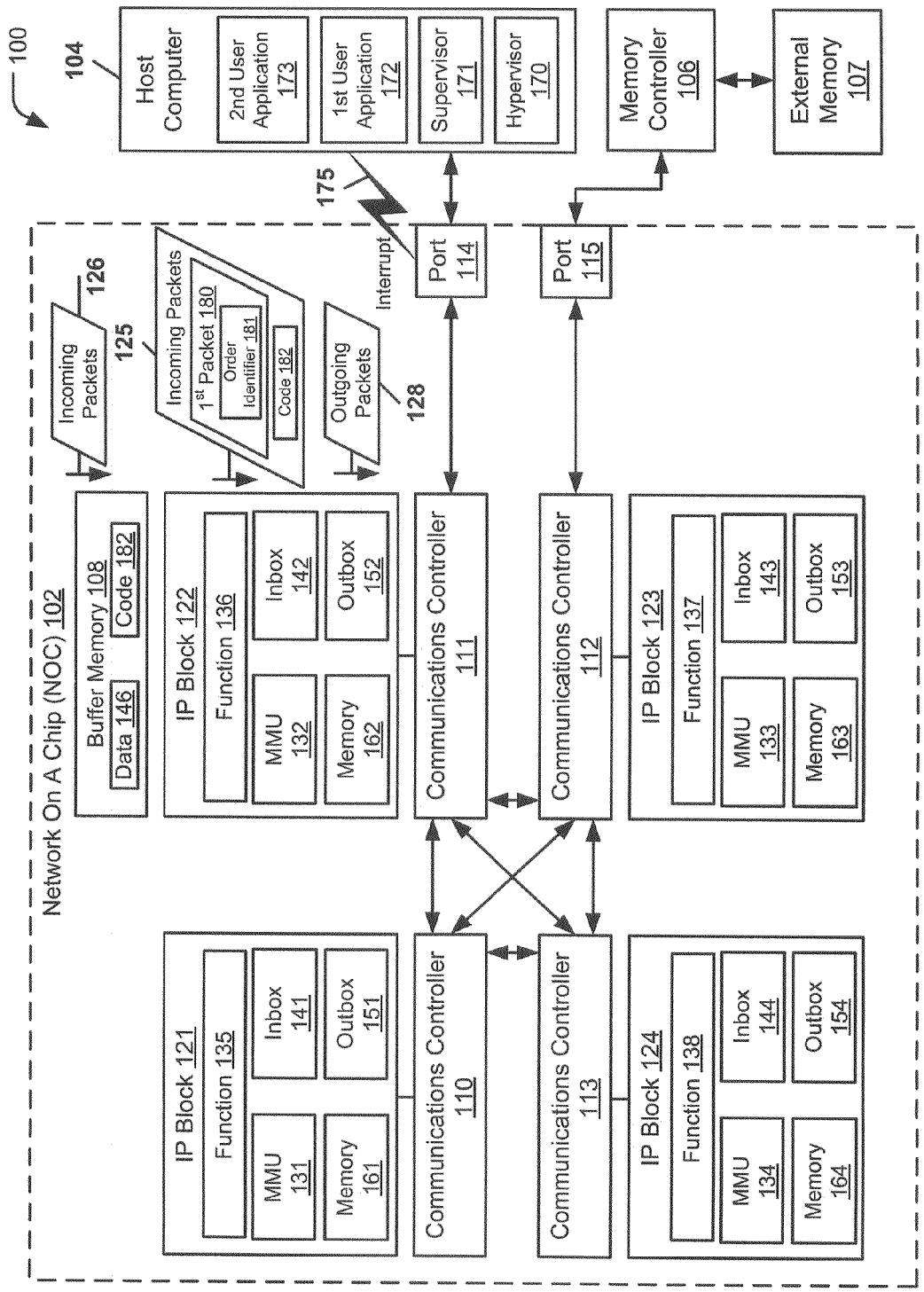
FIG. 1 is a first block diagram of a system to recover data from a plurality of packets.

Referring to FIG. 1, a block diagram of a first embodiment of a system to recover data from a plurality of packets is depicted and generally designated 100. The system 100 includes a network on a chip 102 that is coupled to a host computer 104 and coupled to an external memory 107 via a memory controller 106. In the system 100, a hypervisor 170 or a supervisor 171 that are executing on the host computer may enable user applications executing on the host computer 104 to access the network on a chip 102. The network on a chip 102 may be an integrated circuit that includes programmable processing cores that are capable of exchanging data with each other using a high-speed on-chip network. The programmable processing cores of the network on a chip 102 may be known as Integrated Processing (IP) blocks 121-124. Each of the IP blocks 121-124 may be programmable to perform one or more functions. For example, the network on a chip 102 may be configured as a graphic processing unit, with each of the IP blocks 121-124 programmed to perform a particular function in the graphics processing unit.

The host computer 104 may provide a hardware computing environment in which code (i.e., processor executable operational instructions) may execute. For example, the hypervisor 170 may be code that runs at a relatively low level, such as at a firmware level, to enable multiple operating systems to run concurrently on the host computer 104. The supervisor 171 may run at a relatively higher level than the hypervisor 170. For example, the supervisor 171 may be an operating system. The hypervisor 170 and the supervisor 171 may be considered "trusted" code. Lower level code, such as the hypervisor 170 and the supervisor 171, may have fewer access restrictions than higher level code, such as code running at a user application access level. For example, the hypervisor 170 and the supervisor 171 may have fewer access restrictions than user applications 172-173. To illustrate, the hypervisor 170 and the supervisor 171 may have unrestricted access to all of the resources of the network on a chip 102, such as the IP blocks 121-124, inboxes 141-144, outboxes 151-154, memories 161-164 (via memory management units 161-164), and a buffer memory 108.

User applications, such as the user applications 172-173, may have limited access to the resources of the network on a chip 102 because the user applications run at the user application access level (e.g., the user applications are not considered "trusted" code). For example, the user applications 172-173 may be able to send incoming packets 125-126 to the network on a chip 102 but may not be able to access the incoming packets 125-126 until the hypervisor 170 unpacks contents of the incoming packets 125-126 to a buffer memory, such as buffer memory 108. The user applications 172-173 may have direct access to some but not all of the resources of the network on a chip 102. For example, the user applications 172-173 may have direct access to the buffer memory 108 but may not have direct access to other resources of the network on a chip 102.

The network on a chip 102 may include a plurality of integrated processing (IP) blocks, such as IP blocks 121, 122, 123 and 124, and one or more buffer memories, such as the buffer memory 108. The buffer memory 108 may be a register file memory, a cache memory, a buffer memory, a local store memory, another type of memory, or any combination thereof. The user applications 172-173 may have access to the buffer memory 108 and may have restricted access to other resources of the network on a chip 102. For example, the user applications 172-173 may be able to send the incoming packets 125-126 to one or more of the inboxes 141-144 but may not be able to access the incoming packets when they are in the inboxes 141-144. The buffer memory 108 may be used to buffer data, such as data 146, to enable the user applications 172-173 to communicate with each other using the low-level resources of the network on a chip 102. For example, the first user application 170 may send incoming packets 125-126 to an inbox of one of the IP blocks 121-124. The hypervisor 170 may retrieve the data 146 from the incoming packets 125-126 and store the data 146 at the buffer memory 108. The hypervisor 170 may instruct the second user application 173 to retrieve the data 146 from the buffer memory. In this way, the user applications 172-173 may rapidly communicate with each other without the overhead of having to write to or read from the external memory 107 by using low-level resources of the network on a chip 102.

Each of the IP blocks 121-124 may be programmable to perform a particular function. To illustrate, the IP block 121 may be programmable to perform a function 135, the IP block 122 may be programmable to perform a function 136, the IP block 123 may be programmable to perform a function 137, and the IP block 124 may be programmable to perform a function 138. The IP blocks 121-124 may be programmable to perform the functions 135-138 via software instructions, such as the code 182. For example, a user application, such as the user applications 172-173, may send the incoming packets 125-126 that include the code 182 to the IP block 122. The hypervisor 170 may retrieve the code 182 from the incoming packets 125-126 and store the code 182 at the buffer memory 108. The hypervisor 170 may instruct the IP block 122 to execute the code 182 to perform the function 136. The IP blocks 121-124 may be programmable to perform at least one of a host interface processor function, a geometry engine function, a rasterizer function, a pixel shader, a ray tracing function, a Z-test function, a physics accelerator function, a compression function, a decompression function, a regular expression parse function, an encrypt function, a decrypt function, an H.264 video codec function, another function or any combination thereof.

Each of the IP blocks 121-124 may include one or more resources, such as an inbox, an outbox, a memory management unit (MMU), and a memory. For example, in FIG. 1, the IP block 121 includes the inbox 141, the outbox 151, the memory management unit 131, and the on-chip memory 161. The IP block 122 includes the inbox 142, the outbox 152, the memory management unit 132, and the on-chip memory 162. The IP block 123 includes the inbox 143, the outbox 153, the memory management unit 133, and the on-chip memory 163. The IP block 124 includes the inbox 144, the outbox 154, the memory management unit 134, and the on-chip memory 164. The hypervisor 170 may enable user applications, such as the user applications 172-173, to access the resources of the IP blocks 121-124. For example, the hypervisor 170 may enable the user applications 172-173 to access one or more of the inboxes 141-144, the outboxes 151-154, and the memories 161-164 via the MMUs 131-134. To illustrate, the first user application 172 may send incoming packets 125-126 to the inbox 142. The hypervisor 170 may retrieve the data 146 from the incoming packets 125-126 and store the data 146 at the buffer memory 108. The hypervisor 170 may instruct the second user application 173 to retrieve the data 146 from the buffer memory 108. In this way, the hypervisor 170 may enable the user applications 172-173 to communicate with each other via the resources of the IP blocks 121-124.

Each of the IP blocks 121-124 may be communicatively coupled to a communications controller that enables the IP blocks 121-124 to communicate among themselves, with the host computer 104, and with the memory controller 106. In FIG. 1, the IP block 121 is communicatively coupled to a communications controller 110, the IP block 122 is communicatively coupled to a communications controller 111, the IP block 123 is communicatively coupled to a communications controller 112, and the IP block 124 is communicatively coupled to a communications controller 113. The communications controllers 110-113 may communicate with the host computer 104 via port 114 and with the memory controller 106 via port 115. The communications controllers 110-113 may include packet routing functionality, packet switching functionality, other communications functionality, or any combination thereof. For example, the user applications 172-173 may send the incoming packets 125-126 to one or more of the inboxes 141-144 via the port 114. The user applications 172-173 may retrieve the data 146 from the buffer memory 108 via the port 114.

The inboxes 141-144 may receive incoming packets destined for the IP blocks 121-124. For example, the inbox 142 of the IP block 122 may receive incoming packets 125-126 from one or more of the other IP blocks 121, 123, and 124 and from the host computer 104. The IP blocks 121-124 may use the outboxes 151-154 to send outgoing packets to each other and to the host computer 104. For example, the outbox 152 of the IP block 122 may be used to send outgoing packets 128 to one or more of the other IP blocks 121, 123 and 124 and to the host computer 104.

The MMUs 131-134 of the IP blocks 121-124 may enable access to the on-chip memories 161-164. For example, the IP block 121 may use the MMU 131 to access the on-chip memory 161. The IP block 122 may use the MMU 132 to access the on-chip memory 162. The IP block 123 may use the MMU 133 to access the on-chip memory 163. The IP block 124 may use the MMU 134 to access the on-chip memory 164.

To enable user applications, such as the user applications 172-173, to access low level resources of the network on a chip 102, the hypervisor 170 or the supervisor 171 may supervise the access to the low-level resources of the network on a chip 102. For example, the hypervisor 170 may enable the user applications 172-173 to exchange data with each other or with the IP blocks 121-124 via one or more of the inboxes 141-144, the outboxes 151-154, the memories 161-164, and the buffer memory 108. To illustrate, the hypervisor 170 may recover the data 146 from the incoming packets 125-126 sent from the first user application 172 and store the data 146 in a location (e.g., the buffer memory 108) that is accessible to the second user application 173. After retrieving the data 146 from the incoming packets 125-126 but before storing the data 146 at the buffer memory 108, the hypervisor 170 may scan the data 146 for viruses and malware. The hypervisor 170 may determine whether the number of packets sent is excessive enough to warrant restricting the number of packets that the user applications 172-173 can send. While the hypervisor 170 is used as an example of enabling user applications to access low-level resources of the network on a chip 102, it should be understood that the hypervisor 170, the supervisor 171, other trusted software code, or any combination thereof may be used to enable user applications to access low-level resources of the network on a chip 102.

The memory controller 106 may be coupled to the external memory 107. For example, the external memory 107 may be a random access memory (RAM) device, a hard disk drive, an optical memory drive, another type of memory device, or any combination thereof.

In operation, an IP block, such as the IP block 122, may receive the incoming packets 125-126 from a user application (e.g., one or more of the user applications 172-173). For example, the incoming packets 125-126 may be received at an inbox, such as one of the inboxes 141-144. The packets 125-126 may include a first packet 180 that includes an order identifier 181. For example, the order identifier 181 may indicate the start of data associated with the second user application 173 that implements a pixel shader application. To illustrate, the first user application 172 may send the data packets 125-126 to the second user application 173 via the inboxes 141-144 of the network on a chip 102. This may enable the user applications 172-173 to rapidly exchange data with each other without having to write to or read from the external memory 107.

The hypervisor 170 may recover the data 146 from the incoming packets 125-126 and perform various actions on the data 146. For example, the hypervisor 170 may recover the data 146 from the incoming packets 125-126 and store the data 146 in the buffer memory 108 that is accessible to the user applications 172-173. To illustrate, the first user application 172 may send the incoming packets 125-126. The hypervisor 170 may recover the data 146 from the incoming packets 125-126 and store the data 146 in the buffer memory 108. The hypervisor 170 may instruct the second user application 173 to retrieve the data 146 from the buffer memory 108. For example, the second user application 173 may perform a user-defined pixel shader application and the data 146 may be input data for the user-defined pixel shader application (i.e., the second user application 173).

The hypervisor 170 may reorder the incoming packets 125-126 based on an order identifier (e.g., the order identifier 181) associated with each packet, and store the reordered packets as the data 146. The hypervisor 170 may uncompress the incoming packets 125-126 and store the uncompressed packets as the data 146. The hypervisor 170 may scan the data 146 for viruses/malware and may delete any packets that contain a virus/malware. The hypervisor 170 may determine whether a number of the incoming packets 125-126 satisfy a threshold. When the number of the incoming packets 125-126 satisfies the threshold, the hypervisor 170 may impose bandwidth restrictions on the user application that sent the incoming packets 125-126.

The hypervisor 170 may recover the data 146 from the incoming packets 125-126 and store the recovered data in a dedicated packet collection memory, such as the buffer memory 108, within the network on the chip 102. The hypervisor 170 may instruct one or more of the user applications 172-173 and the IP blocks 121-124 to retrieve and process the data 146. The hypervisor 170 may copy the data 146 to one or more of the inboxes 141-144 and the on-chip memories 161-164 to enable the IP blocks 121-124 to process the data 146. For example, the hypervisor 170 may copy the data 146 to the inbox 142 or to the memory 162 to enable the IP block 122 to process the data 146.

The incoming packets 125-126 may include the code 182 that is executable by one or more of the IP blocks 121-124 to perform a particular function. For example, the hypervisor 170 may recover the code 182 from the incoming packets 125-126 and instruct the IP block 122 to execute the code 182 to perform the function 136. To illustrate, executing the code 182 may cause the IP block 122 to perform a user-specified pixel shader function. In this context, "user-specified" means that a user can provide code for one of the IP blocks 121-124 to execute to perform a particular function. A pixel shader is a type of shader program, often executed on a graphics processing unit, to calculate attributes, such as color, of each pixel in a three-dimensional image. A user-specified pixel shader may enable a video game creator to provide a particular look and feel to a video game.

The data 146 stored in the buffer memory 108 may be retained during an interruption event, such as when an interrupt 175 occurs. For example, the interrupt 175 may occur prior to a context switch, i.e. after the host computer 104 stops executing a first context (not shown) associated with the first application 172 and before the host computer starts executing a second context (not shown) associated with the second application 173. Upon completion of the interrupt 175 event, the hypervisor 170 may copy the data 146, that was stored in the buffer memory 108 prior to the interrupt 175, to one or more of the inboxes 141-144.

The first user application 172 may send a sequence of packets to the second user application 173 via the incoming packets 125-126 (i.e. the incoming packets 125-126 may be sequenced in a particular order to form a complete packet sequence). When the interrupt 175 occurs before the complete packet sequence is received, the hypervisor 170 may continue to recover the data 146 from the incoming packets 125-126 and store the data 146 at the buffer memory 108 until the packet sequence is complete. For example, the interrupt 175 may occur after the incoming packets 125 are received at the inbox 142 but before the incoming packets 126 are received at the inbox 142. The hypervisor 170 may begin recovering the data 146 from the incoming packets 125 before the interrupt 175 occurs and continue recovering the data 146 from the incoming packets 126 after the interrupt 175 has occurred to receive the complete packet sequence.

In a particular embodiment, the hypervisor 170 may delay a context switch, thereby delaying the occurrence of the interrupt 175, until after the data 146 is retrieved from the incoming packets 125-126. For example, the hypervisor 170 may begin retrieving the data 146 from the incoming packets 125, determine that a context switch is about to occur, delay the context switch, continue retrieving the data 146 from the incoming packets 126, and then perform the context switch.

Thus, user applications, such as the user applications 172-173, may utilize low-level resources of the network on a chip 102, such as the inboxes 141-144, to rapidly communicate with each other without having to access the external memory 107. The user applications 172-173 can send packets, such as the incoming packets 125-126, to the inboxes 141-144. The hypervisor 170, the supervisor 171, or a combination of both may execute at a level that enables access to the resources of the network on a chip 102 and may recover/retrieve data, such as the data 146, from the incoming packets 125-126. The hypervisor 170 may perform various actions on the data 146, such as reordering the data packets based on an associated order identifier to create the data 146, scanning the data 146 for viruses, uncompressing/decoding the data 146, and storing the data 146. For example, the data 146 may be stored at the buffer memory 108. The hypervisor 170 may instruct one or more of the user applications 172-173 that the data 146 may be accessed at the buffer memory 108. The hypervisor 170 may copy the data 146 to one or more of the inboxes 141-144 and the memory 161-164 to enable one or more of the IP blocks 121-124 to process the data 146. The hypervisor 170 may recover the data 146 from the incoming packets 125-126 while an interruption event, such as a context switch occurs. The hypervisor 170 may delay the interruption event until after recovering the data 146 from a complete packet sequence.

Figure 2:
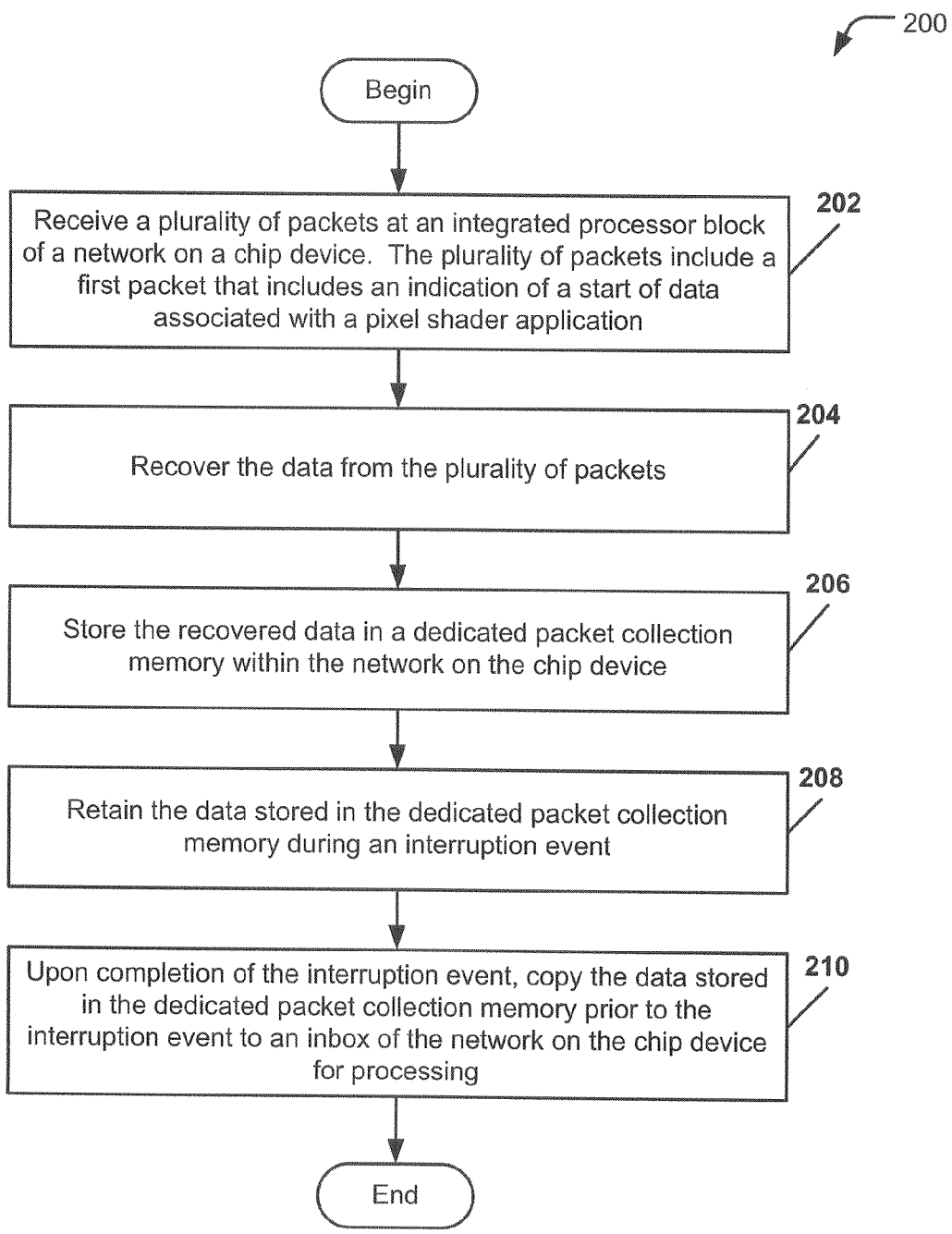
FIG. 2 is a first flow diagram of a method to recover data from a plurality of packets.

Referring to FIG. 2, a first flow diagram of a method to recover data from a plurality of packets is depicted and generally designated 200. The method 200 may be performed by the hypervisor 170 of FIG. 1, the supervisor 171 of FIG. 1, or any combination thereof.

A plurality of packets is received at an IP block of a network on a chip device, at 202. The plurality of packets includes a first packet that includes an indication of a start of data. For example, in FIG. 1, the incoming packets 125-126 may be received at one of the inboxes 141-144 of the IP blocks 121-124. The incoming packets 125-126 may be a sequence a packets, with a first packet of the incoming packets including an indication of a start of the data 146 in the incoming data packets 121-124. The data 146 in the data packets 125-126 may be input data that is destined for the second user application 173. For example, the data 146 may be input data for a user-defined pixel shader function that is performed by the second user application 173. Moving to 204, data is recovered (i.e., retrieved) from the plurality of packets. Advancing to 206, the recovered data is stored in a dedicated packet collection memory within the network on the chip device. For example, in FIG. 1, the hypervisor 170 or the supervisor 171 may recover the data 146 from the incoming packets 125-126 and store the data 146 at the buffer memory 108.

Proceeding to 208, the data stored in the dedicated packet collection memory is retained during an interruption event. Moving to 210, upon completion of the interruption event, the data stored in the dedicated packet collection memory prior to the interruption event is copied to an inbox of the network on the chip device for processing and the method 200 ends. For example, in FIG. 1, the hypervisor 170 or the supervisor 171 may retain the data 146 when the interrupt 175 occurs and copy the data 146 to one or more of the inboxes 141-144 for processing by one or more of the IP blocks 121-124.

Thus, a first user application and a second user application may rapidly communicate with each other via resources of a network on a chip. For example, a hypervisor may enable the first user application to send incoming packets to the network on a chip. The hypervisor may recover data from the incoming packets sent to the network on a chip. The hypervisor may store the recovered data in a buffer memory that is accessible to the second user application. The data stored in the buffer memory may be retained during an interruption event, such as a context switch.

Figure 3:
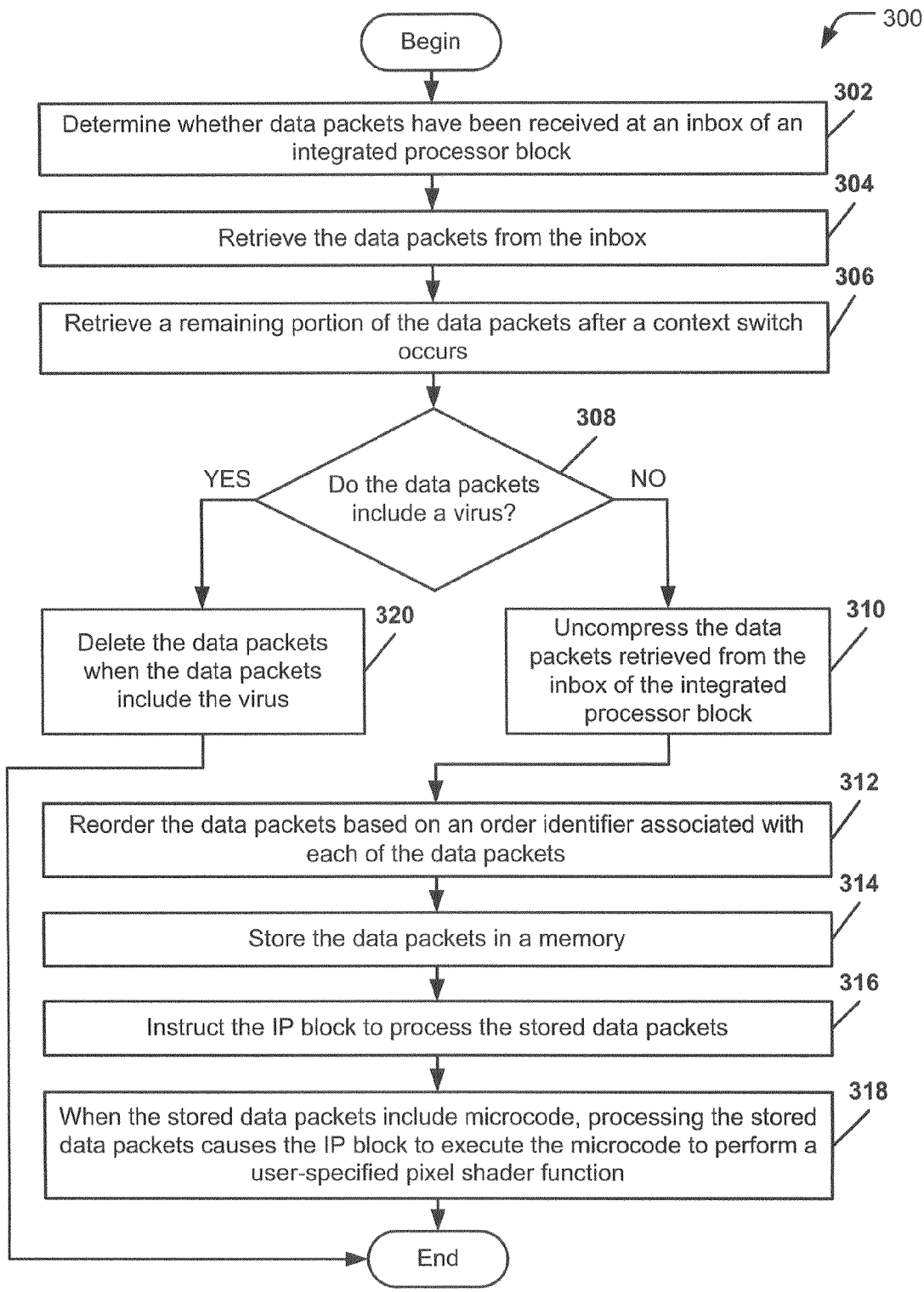
FIG. 3 is a second flow diagram of a method to recover data from a plurality of packets.

Referring to FIG. 3, a second flow diagram of a method to recover data from a plurality of packets is depicted and generally designated 300. The method 300 may be performed by the hypervisor 170 of FIG. 1, the supervisor 171 of FIG. 1, or any combination thereof.

A determination is made whether data packets have been received at an inbox of an IP block, at 302. Moving to 304, the data packets are retrieved (e.g., recovered) from the inbox. Advancing to 306, a remaining portion of the data packets may be retrieved after a context switch occurs. For example, in FIG. 1, the hypervisor 170 may determine that the incoming packets 125 have been received at the inbox 142 of the IP block 122. The hypervisor 170 may retrieve the incoming packets 125 from the inbox 142. After the interrupt 175 occurs, the hypervisor 170 may retrieve a remaining portion (e.g., the incoming packets 126) from the inbox 142. Proceeding to 308, a determination may be made whether the data packets include a virus (or malware). For example, in FIG. 1, the hypervisor 170 may scan the incoming packets 125-126 to determine whether the incoming packets include a virus or malware. When the data packets include a virus (or malware), the data packets may be deleted, at 320 and the method 300 ends.

When the data packets do not include a virus (or malware), the data packets retrieved from the inbox of the IP block may be uncompressed, at 310. Moving to 312, the data packets may be reordered based on an order identifier associated with each of the data packets. Continuing to 314, the data packets are stored in a memory. For example, in FIG. 1, the hypervisor 170 may reorder the incoming packets 125-126 before storing them as the data 146 in the buffer memory 108. The hypervisor 170 may uncompress the incoming packets 125-126 and store the resulting data 146 in the buffer memory 108.

Proceeding to 316, the IP block may be instructed to process the stored data packets. Advancing to 318, when the stored data packets include code, processing the stored data packets may cause the IP block to execute the code to perform a user-specified pixel shader function and the method 300 ends. For example, in FIG. 1, the hypervisor 170 may instruct the IP block 122 to process the data 146 to perform a user-specified function, such as a pixel shader function. When the data packets include the virus, at 408, the data packets may be deleted, at 320 and the method 300 ends.

Thus, a hypervisor or supervisor may enable user applications to communicate with each other via resources of a network on a chip. For example, a first user application may send incoming packets to a network on a chip. The hypervisor or supervisor may retrieve data from the incoming packets and store the data in a buffer memory. The hypervisor or supervisor may perform various actions before storing the data in the buffer memory. For example, the hypervisor or supervisor may scan the packets for a virus or for malware, reorder the incoming packets, or uncompress the incoming packets before storing the packets as data in the buffer memory.

Figure 4:
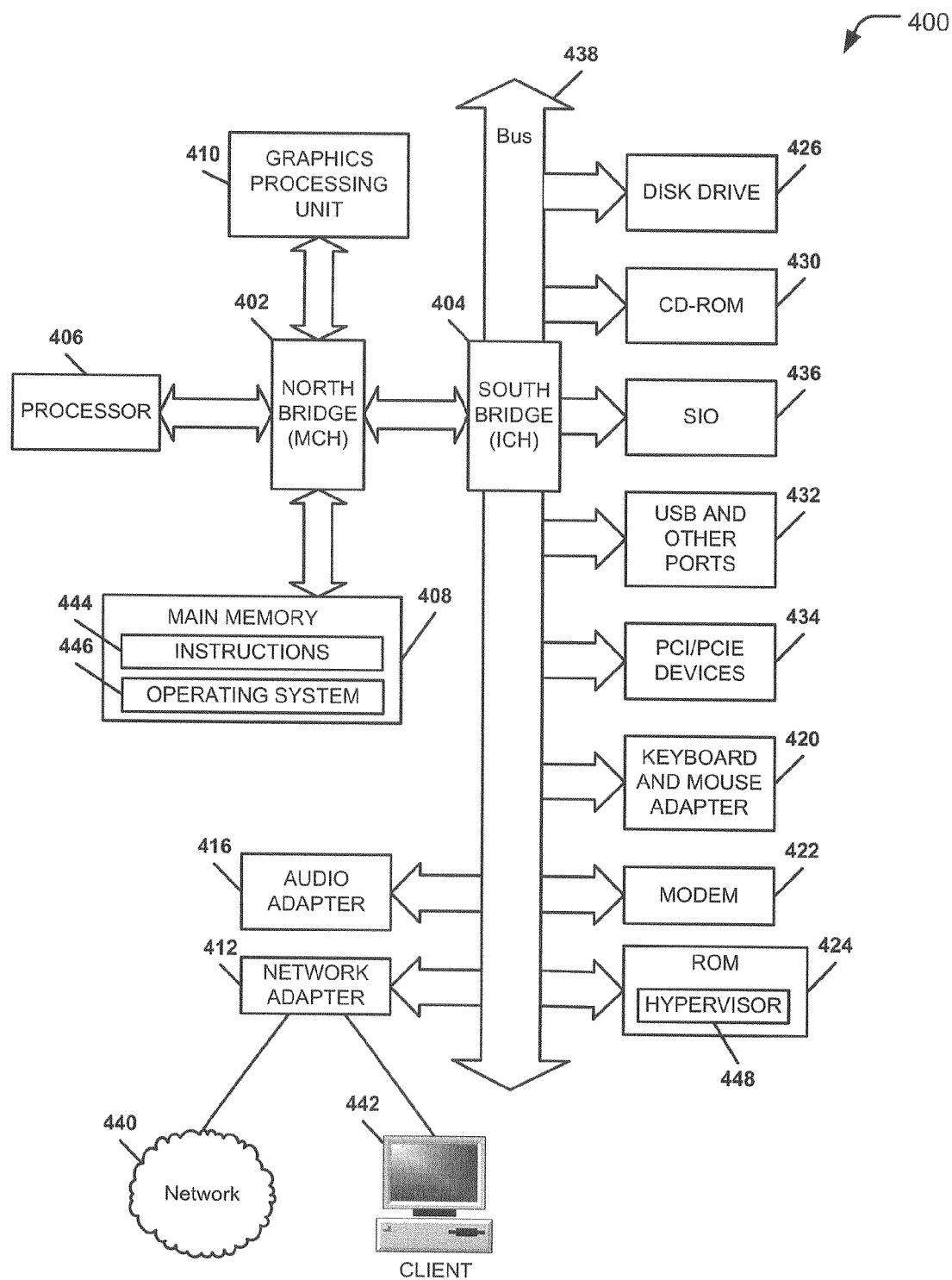
FIG. 4 is a block diagram of a general computing system.

FIG. 4 is a block diagram of a computing system 400 in which systems and methods of the present disclosure may be implemented. The computing system 400 includes an example of a network on a chip, such as the network on a chip 102 of FIG. 1, that is configured as a graphics processing unit 410.

In the depicted example, the computing system 400 employs a hub architecture including a north bridge and a memory controller hub (MCH) 402 and a south bridge and input/output (I/O) controller hub (ICH) 404. A processor 406, a main memory 408, and the graphics processing unit 410 are coupled to the north bridge and memory controller hub 402. For example, the graphics processing unit 410 may be coupled to the MCH 402 through an accelerated graphics port (AGP) (not shown).

In the depicted example, a network adapter 412 is coupled to the south bridge and I/O controller hub 404 and an audio adapter 416, a keyboard and mouse adapter 420, a modem 422, a read only memory (ROM) 424, universal serial bus (USB) ports and other communications ports 432, and Peripheral Component Interconnect (PCI) and Peripheral Component Interconnect Express (PCIe) devices 434 are coupled to the south bridge and I/O controller hub 404 via bus 438. A disk drive 426 and a CD-ROM drive 430 are coupled to the south bridge and I/O controller hub 404 through the bus 438. The PCI/PCIe devices 434 may include, for example, Ethernet adapters, add-in cards, and PC cards for notebook computers. The ROM 424 may be, for example, a flash binary input/output system (BIOS) that includes a hypervisor 448. The hypervisor 448 may execute at a hypervisor access level that enables unrestricted access to the hardware and software resources of the computing system 400. The disk drive 426 and the CD-ROM drive 430 may use, for example, an integrated drive electronics (IDE) or serial advanced technology attachment (SATA) interface. A super I/O (SIO) device 436 may be coupled to the south bridge and I/O controller hub 404.

The main memory 408 includes computer instructions 444 on a computer readable medium. The computer instructions 444 are executable by the processor 406 or the graphic processing unit 410 to perform various functions. For example, the computer instructions 444 may executed as the user applications 172-173 of FIG. 1. The instructions 444 may execute at a user access level that enables restricted (i.e., limited or supervised) access to the hardware and software resources of the computing system 400.

An operating system 446 runs on the processor 406 and coordinates and provides control of various components within the computing system 400. The operating system 446 may be a commercially available operating system such as Microsoft® Windows® XP (Microsoft and Windows are trademarks of Microsoft Corporation in the United States, other countries, or both). An object-oriented programming system, such as the Java® programming system, may run in conjunction with the operating system 446 and provide calls to the operating system 446 from Java programs or applications executing on the computing system 400 (Java and all Java-based trademarks are trademarks of Sun Microsystems, Inc. in the United States, other countries, or both). The operating system 446 may execute at a supervisor access level that enables unrestricted access to the hardware and software resources of the computing system 400.

Instructions for the operating system, the object-oriented programming system, and applications or programs are located on storage devices, such as the disk drive 426, and may be loaded into the main memory 408 for execution by the processor 406. The processes of the disclosed illustrative embodiments may be performed by the processor 406 using computer implemented instructions, which may be located in a non-transitory memory such as, for example, the main memory 408, the read only memory 424, or in one or more of the peripheral devices.

The hardware in computing system 400 may vary depending on the implementation. Other internal hardware or peripheral devices, such as flash memory, equivalent non-volatile memory, or optical disk drives and the like, may be used in addition to or in place of the hardware depicted in FIG. 4. For example, the computing system 400 may include internal or external storage devices, such as the external memory 107 of FIG. 1.

In some illustrative examples, portions of the computing system 400 may be implemented in a personal digital assistant (PDA), which is generally configured with flash memory to provide non-volatile memory for storing operating system files and/or user-generated data. A bus system may include one or more buses, such as a system bus, an I/O bus and a PCI bus. Of course, the bus system may be implemented using any type of communications fabric or architecture that provides for transferring data between different components or devices attached to the fabric or architecture. A communications unit may include one or more devices used to transmit and receive data, such as the modem 422 or the network adapter 412. The depicted examples in FIG. 4 and above-described examples are not meant to imply architectural limitations. For example, portions of the computing system 400 also may be implemented in a personal computer, a server, a server cluster, a tablet computer, a laptop computer, or a telephone device in addition to taking the form of a PDA.

Particular embodiments of the computing system 400 can take the form of an entirely hardware embodiment or an embodiment containing both hardware and software elements. In a particular embodiment, the disclosed methods are implemented in software that is embedded in computer-readable non-transitory medium and executed by a processor, which includes but is not limited to firmware, resident software, code, etc.

Further, embodiments of the present disclosure, such as the one or more embodiments in FIGS. 1-4 can take the form of a computer program product accessible from a computer-usable or computer-readable medium providing program code for use by or in connection with a computer or any instruction execution system. For the purposes of this description, a non-transitory computer-usable or computer-readable medium can be any non-transitory medium that can tangibly embody a computer program and that can contain or store the computer program for use by or in connection with the instruction execution system, apparatus, or device.

In various embodiments, the medium can include an electronic, magnetic, optical, electromagnetic, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the data processing system either directly or through intervening I/O controllers.

Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

What is claimed is:

1. A method comprising:
    receiving a plurality of packets from a first user application at an integrated processor block of a network on a chip device, the plurality of packets including a first packet that includes, an indication of a start of data associated with a second user application that implements a pixel shader application, and wherein the data includes input data for the pixel shader application;
    recovering, by a hypervisor, the data from the plurality of packets;
    storing, by the hypervisor, the recovered data in a dedicated packet collection memory within the network on the chip device, wherein the dedicated packet collection memory is accessible by the first and second user applications, and wherein the dedicated packet collection memory facilitates exchange of the data between the first and second user applications through the network on the chip device;
    retaining, by the hypervisor the data stored in the dedicated packet collection memory during an interruption event; and
    upon completion of the interruption event, copying, by the hypervisor, the data stored in the dedicated packet collection memory prior to the interruption event to an inbox of the network on the chip device for processing.

2. The method of claim 1, wherein the interruption event is a context switch event.

3. The method of claim 1, wherein the pixel shader application is executable at a user application level and wherein the data is recovered from the plurality of packets at a hypervisor level.

4. The method of claim 1, wherein the integrated processor block includes the inbox to receive the plurality of packets, an outbox to send outgoing packets, an on-chip memory, and a memory management unit to enable access to the on-chip memory, wherein the integrated processor block is programmable to perform a particular function via a software application.

5. The method of claim 1, further comprising scanning, by the hypervisor, the data recovered from the plurality of packets for a virus.

6. The method of claim 1, further comprising uncompressing, by the hypervisor, the data recovered from the plurality of packets.

7. The method of claim 1, wherein, when the interruption event occurs before receipt of a complete packet sequence, the hypervisor continues to recover the data from the plurality of packets and store the recovered data in the dedicated packet collection memory until the packet sequence is complete.

8. A computer program product comprising a non-transitory computer usable medium having computer usable program code embodied therewith, the computer usable program code executable by a processor to:
    determine, by a hypervisor, whether data packets have been received from a first user application at an inbox of an integrated processor block of a network on a chip device, the data packets including a first packet that includes an indication of a start of data associated with a second user application that implements a user-defined pixel shader function, and wherein the data includes input data for the user-defined pixel shader function;
    retrieve, by the hypervisor, the data packets from the inbox;
    store, by the hypervisor, the data packets in a dedicated packet collection memory within the network on the chip device, wherein the dedicated packet collection memory is accessible by the first and second user applications, and wherein the dedicated packet collection memory facilitates exchange of the data packets between the first and second user applications through the network on the chip device; and
    instruct, by the hypervisor, the integrated processor block to process the stored data packets,
    wherein, when the stored data packets include code, processing the stored data packets causes the integrated processor block to execute the code to perform the user-specified pixel shader function.

9. The computer program product of claim 8, wherein the computer usable program code is further executable by the processor to:
    uncompress, by the hypervisor, the data packets retrieved from the inbox of the integrated processor block before storing the data packets in the dedicated packet collection memory;
    copy, by the hypervisor, the uncompressed data packets from the dedicated packet collection memory to at least one of the inbox of the integrated processor block or an on chip memory of the integrated processor block for processing; and
    instruct, by the hypervisor, the integrated processor block to process the stored data packets from the at least one of the inbox of the integrated processor block or the on chip memory of the integrated processor block with the uncompressed data packets.

10. The computer program product of claim 8, wherein the computer usable program code is further executable by the processor to reorder, by the hypervisor, the data packets based on an order identifier associated with each of the data packets before storing the uncompressed data packets in the dedicated packet collection memory.

11. The computer program product of claim 8, wherein a software application sends the data packets to the inbox of the integrated processor, wherein the software application is not permitted to retrieve the data packets from the inbox of the integrated processor block, and wherein the hypervisor is permitted to retrieve the data packets from the inbox of the integrated processor block.

12. The computer program product of claim 8, wherein the computer usable program code is further executable by the processor to:
    after retrieving the data packets from the inbox, scan the data packets to determine whether the data packets include a virus; and
    delete the data packets when the data packets include the virus.

13. The computer program product of claim 8, wherein the dedicated packet collection memory is one of a register file memory, a cache memory, a buffer memory, and a local store memory.

14. The computer program product of claim 8, wherein the computer usable program code is further executable by the processor to:
    retrieve, by the hypervisor, second data packets after a context switch occurs, wherein the data packets and the second data packets comprising a complete packet, sequence; and
    store, by the hypervisor, the second data packets at the dedicated packet collection memory after the context switch occurs.

15. The computer program product of claim 8, wherein a context switch is delayed by the hypervisor until after the retrieved data packets are stored at the dedicated packet collection memory.

16. A system, comprising:

a processor; and a non-transitory medium comprising program code executable by the processor to:

retrieve by a hypervisor, data packets received from a first user application at an inbox associated with an integrated processor block of a network on a chip device, the data packets including a first packet that includes an indication of a start of data associated with a second user application that implements a pixel shader function;

store, by the hypervisor, the data packets in a dedicated packet collection memory within the network on the chip device, wherein the dedicated packet collection memory is accessible by the first and second user applications, and wherein the dedicated packet collection memory facilitates exchange of the data packets between the first and second user applications through the network on the chip device; and instruct, by the hypervisor, the integrated processor block to process the stored data packets, wherein the integrated processor block is operable to perform the pixel shader function and wherein the stored data packets comprise input data to the pixel shader function.

17. The system of claim 16, wherein, when a context switch event occurs, the program code is further executable by the processor to receive, by the hypervisor, additional data packets that are destined for the inbox associated with the integrated processor block and to store, by the hypervisor, the additional data packets in the dedicated packet collection memory.

18. The system of claim 17, wherein, after the context switch event has completed, the program code is further executable by the processor to:

copy, by the hypervisor, the additional data packets from the dedicated packet collection memory to at least one of the inbox of the integrated processor block or an on chip memory of the integrated processor block for processing; and instruct, by the hypervisor, the integrated processor block to process the additional data packets from the at least one of the inbox of the integrated processor block or the on chip memory of the integrated processor block with the additional data packets.

19. The system of claim 16, wherein, before storing the data packets in the dedicated packet collection memory, the program code is further executable by the processor to:

decompress, by the hypervisor, the data packets; and order, by the hypervisor, the decompressed data packets based on an order identifier associated with each of the decompressed data packets.

20. The system of claim 16, wherein the program code is further executable by the processor to instruct, by the hypervisor, the second user application to retrieve the stored data packets from the dedicated packet collection memory.

\* \* \* \* \*